United States Patent [19]

Fox et al.

[11] Patent Number: 5,350,303
[45] Date of Patent: Sep. 27, 1994

[54] METHOD FOR ACCESSING INFORMATION IN A COMPUTER

[75] Inventors: David S. Fox, Summit; Hosagrahar V. Jagadish, Berkeley Heights; Lawrence O'Gorman, Millburn, all of N.J.; Guy A. Story, New York, N.Y.

[73] Assignee: AT&T Bell Laboratories, Murray Hill, N.J.

[21] Appl. No.: 782,842

[22] Filed: Oct. 24, 1991

[51] Int. Cl.$^5$ .............................................. G09B 19/00
[52] U.S. Cl. ................................. 434/118; 434/169; 434/307 R; 434/365; 358/447; 395/164; 395/166; 382/57
[58] Field of Search ............... 434/118, 156, 157, 169, 434/185, 307, 308, 322, 323, 350, 362, 365; 358/444, 447, 22, 213.23; 395/164, 166, 400, 425, 927; 382/58, 65, 57, 61, 10; 364/488–491

[56] References Cited

U.S. PATENT DOCUMENTS

| | | | |
|---|---|---|---|
| 4,196,453 | 4/1980 | Warren | 358/447 |
| 4,682,869 | 7/1987 | Itoh et al. | 358/447 X |
| 4,914,709 | 4/1990 | Rudak | 382/65 X |
| 4,933,979 | 6/1990 | Suzuki et al. | 382/61 |
| 4,935,879 | 6/1990 | Ueda | 395/164 X |
| 5,150,462 | 9/1992 | Takeda et al. | 395/166 |

Primary Examiner—R. J. Apley
Assistant Examiner—Joe H. Cheng
Attorney, Agent, or Firm—Henry T. Brendzel

[57] ABSTRACT

An electronic library which comprises a user interface such as a computer screen, a speaker, a mouse and/or a keyboard; a processor for handling communication with the user and for responding to user requests; and a data store. The data store maintains scanned segments of video data, audio data, or both, and translated replicas of the scanned segments. Searching for specific data is performed by perusing through the translated replicas, but the information that is provided to the user is primarily the scanned segments themselves. The translated versions contain the immediately translatable version of the displayable information and processed information that forms various aggregations of the displayable information. This processing imposes a syntactically logical structure on the displayable information.

27 Claims, 3 Drawing Sheets

METHOD FOR ACCESSING INFORMATION IN A COMPUTER

This invention relates to electronic libraries and more specifically to electronic storage and retrieval of information. More generally, this invention relates to storing documents and other audio visual information segments in a computer, and retrieving those documents in response to user queries.

For decades the electronic library has been the holy grail for farthinking librarians, writers, and computer scientists. Examples include the "world information monopoly", presented in 1936 by H. G. Wells in *World Brain*; MEMEX, described in 1945 by Vannevar Bush in his classic article *As We May Think*; and others.

Full-text databases such as NEXIS and NewsNet are now available, and since they do provide text information they may be considered "libraries". With NEXIS, for example, the wealth of information that can be gathered in a very short time is staggering, and this makes these databases very powerful and valuable resources. However, they lack the ability to store, search, retrieve and display pictures, graphs, etc., and they do not offer a comfortable environment for browsing.

It is important to realize that ASCII representations of text, such as found in NEXIS do not convey all of the information that an original printed text does. Disregarding possible transcription errors, some information simply cannot be conveyed when the original printed text is discarded. In addition to the aforementioned pictures, accenting and highlighting are lost, mathematical equations are almost impossible to comprehend, unusual symbols cannot be represented, etc.

Also, a fair amount of information is contained in the position of text on the page (such as in a business letter), and that information is lost in systems such as NEXIS. The written word has had been around for centuries, and writing formats have been adopted over the years that are easily recognized and understood by readers. These formats have been honed to convey information efficiently. Thus, a mere space can in some circumstances communicate as much information as an undecipherable scribble, or a whole sentence. For example, a substantial space in the beginning of a line and before a sentence is recognized as a paragraph delimiter and tells the reader that a new thought is about to be addressed. A scribbling at the end of a letter indicates that the letter was signed by the sender, even if not all of the characters in the scribbling are recognizable.

Additionally, those who regularly read particular types of documents develop a facility to jump to the most important portion of the document simply based on position of the information or other indicia (such as the largest paragraph of a memo, shortest paragraph of the memo, the sentence that is underlined, etc.) That, too, is mostly lost in systems such as NEXIS.

Lastly, the fact that people are simply comfortable with the familiar formats of newspapers, magazines and books should not be underestimated and that familiarity is mostly lost in data base systems such as NEXIS.

Commercial image databases on CD-ROM, such as those recently introduced by UMI, are closer to an electronic library, in that they provide images of the stored pages. This permits the stored images to contain text and pictures. However, these systems are very limited in their search and retrieval capabilities because they require a manual abstracting and indexing of the stored images to provide a key word search capability.

In the optical character recognition (OCR) art, it is now possible to purchase an OCR system that can scan a page of text and identify the printed ASCII characters contained therein, as well as identify the font and size of those characters. Typically, the OCR systems are processor controlled and the (more advanced) programs that implement the OCR recognition algorithms consult a dictionary when a letter is difficult to recognize. The end result of these OCR systems is that a scanned page of text is converted to ASCII form, as best as the program can, and the ASCII form is stored in the system's memory. Upon request, the ASCII text (as good or as bad as it may be) is displayed to the user. The scanned image is not kept.

Even with the availability of all of these diverse capabilities, there is still not a single system that approaches the functionality of a conventional library.

SUMMARY OF THE INVENTION

This invention provides the means for realizing an electronic library that very closely emulates the interaction modes of a physical library. Specifically, the electronic library of this invention maintains an electronically searchable image of all information that it maintains, but, it delivers to the user an audio visual image in response to a user's request. In accordance with the principles of this invention, the electronic library comprises an electronic user interface, such as a computer screen, a speaker, a mouse and/or a keyboard; a processor for handling communication with the user and for responding to user requests; and a data store. The data that is stored is derived from segments of information which were scanned, processed and stored in the system. It is the scanned segments of information (or portions thereof) which, upon request, are provided to the user. Those segments may be images of journals, newspapers, letters, magazines, maps, graphs, etc., and they may also be digitized segments of speech, music and other audio sources. In addition to the stored segments of information that are displayed to the user upon request, translated versions of the same data are also maintained in the data store. The translated versions contain the immediately translatable version of the displayable information and processed information that forms various aggregations of the displayable information. This processing imposes a syntactically logical structure on the displayable information. It is the translated version of the data that forms the electronically searchable source of data.

DETAILED DESCRIPTION

Figure 1:
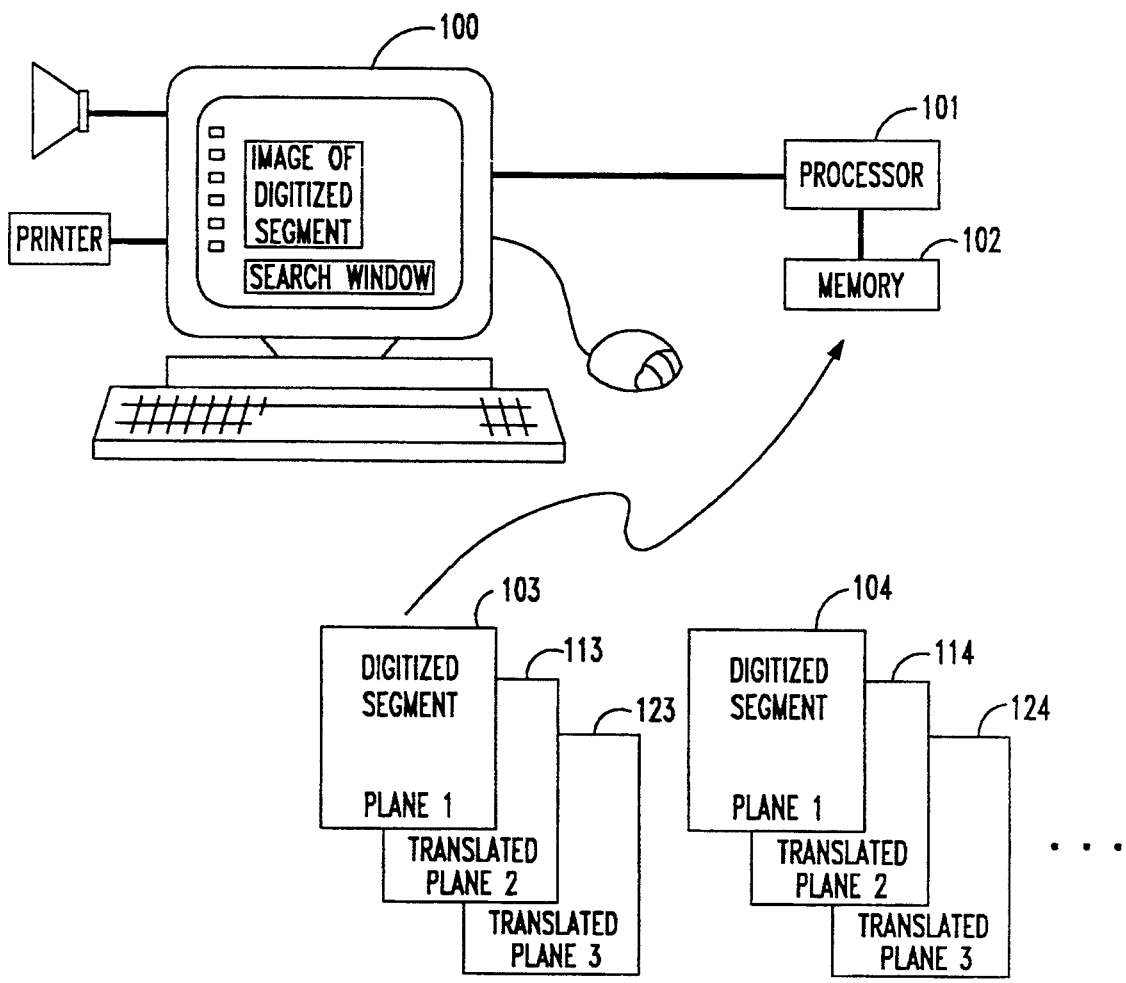
FIG. 1 illustrates in very broad strokes the hardware arrangement for realizing an electronic library, and depicts some of the data structures within memory 102.

FIG. 1 presents an overview of an electronic library system embodying the principles of this invention. Element 100 is the computer screen-keyboard-speaker-printer arrangement that forms the user interface. A user can direct instructions and search queries to the system via the keyboard (or the mouse), and the system responds by either displaying information on the screen or printing it (when the data is visual), or outputting it through the speaker (when the data is aural). Element 100 is connected to processor 101 which interacts with memory 102 and memory 102 contains one or more databases of scanned and digitized segments. Blocks 103 and 104 represent two segments which are stored in memory 102.

It should be pointed out that the types of information that are stored in memory 102 can be quite diverse. The information may be all text, akin to the information stored in the NEXIS database; it may be text co-mingled with pictures, such as magazine articles; it may be primarily picture information, such as charts, graphs, photographs, etc; and it can even be speech or music. Also, there can be more than one database that is stored in memory 102, and the databases do not have to store similar types of data.

FIG. 1 depicts only the two digitized segments 103 and 104, and they are shown side by side. While this suggests a plurality of segments in memory 102, it does not describe how the segments are stored within the memory or, indeed, what information they represent.

The information stored in a particular database might advantageously be stored in a hierarchical structure. For example, one may wish to create a database of technical journals in a particular field of interest. For such a database, at the highest hierarchical level, specific journals are identified. At the next (lower) level, different issues of a selected journal are identified. In the following level, different articles in a selected issue are identified. In a still following level, different pages of a selected article are identified, and in the lowest level, perhaps, different paragraphs are identified.

The term "segment" in this disclosure assumes a meaning that comports with the context in which it is used. When seeking to select a particular article from a collection of articles, "segment" is an article. When searching for a particular page within an article, "segment" is a page. Most of the time, however, the term "segment" refers to a quantum of information that is stored in memory 102 and which can be (or is intended to be) provided to the user as a block. When the information is an image, that may mean the information fits on the screen of arrangement 100.

Returning to FIG. 1, in accordance with the principles of this invention three planes of information are associated with each digitized segment. The first plane contains the digitized representation of the scanned segment itself (e.g. blocks 103 and 104), the second plane contains elemental information that is found in the digitized image (this is shown by blocks 113 and 114), and the third plane contains macro information which identifies groupings of elemental information (this is shown by blocks 123 and 124). When the digitized and scanned segment is an image from a magazine, the elemental information entities of the second plane are letters, lines, symbols, and the like. The macro elements in the third plane are logical groupings such as a title sentence, the author's name, a date, a picture block, and the like. The "information" in the second and third planes form the set of translated information. That is, the information in blocks 113 and 123 contain translations, or transformations of the information in block 103.

Figure 2:
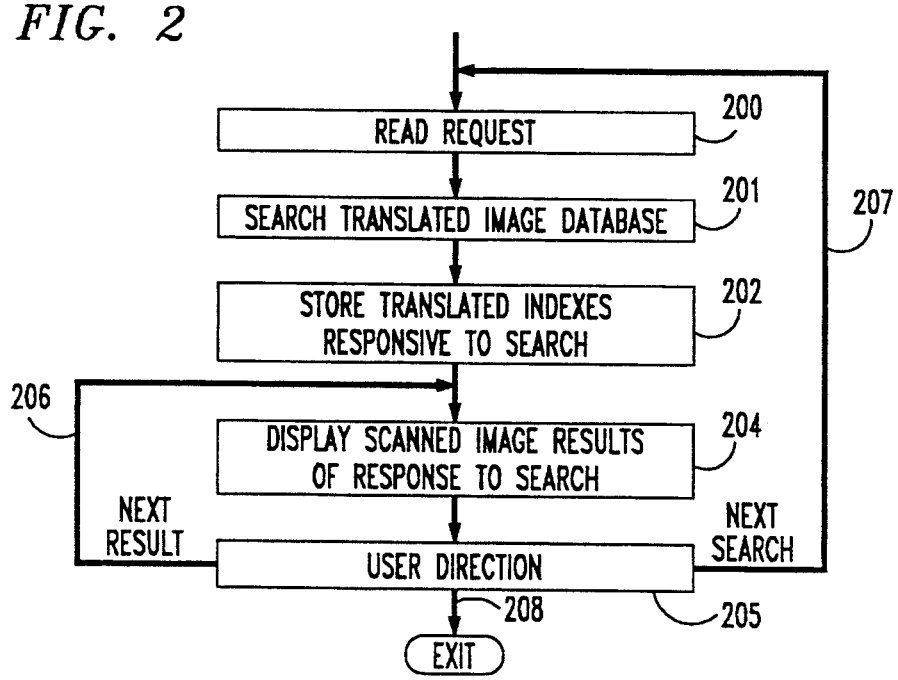
FIG. 2 presents a flow diagram of a search, retrieve and display process in accordance with the principles of this invention.

FIG. 2 presents a general flow diagram of an information retrieval process that derives information from a database setup as the one described in connection with FIG. 1. In block 200, the user enters a query into the system. That query can be formulated by selecting an icon on the computer's screen, by actually typing in the query. This step is completely conventional. Having received a search request, block 201 searches in the translated planes, (e.g., through the information in blocks 113, 114, 123 and 124) for an information segment that matches the search request. The type of segment searched for can be specified by the user as part of the search query, or it may be some default segment type that, perhaps, depends on the type of search specified in the query.

Another way a search query can be formulated is by pointing to, and highlighting, a region on the screen which displays the image. The mechanics of identifying a region are well known. It can be found, for example, in many of the word processing programs that are commercially available, where a cursor may be pointed to a line of text and "dragged" to highlight a portion of a line or a plurality of lines. One difference, however, is that the image shown on the screen is a rendering of stored information, and it is the stored information that is being "highlighted", or linked. In the context of this invention, it is the scanned image that is displayed, it is the scanned image portion that is highlighted and a link to the translated image is identified. The query is executed on what the translated image contains.

The search performed by block 201 results in any number of "hits". If that number is 1 or greater, block 202 stores a pointer to the identified segments of the first plane and to the translated segments of the second and third planes. Thereafter, a display step is carried out by blocks 204 and 205. Specifically, when block 202 contains more than one "hit", block 204 displays one of the digitized segments pointed-to by block 202 and waits for a user input. Block 205 responds to the user's direction. When a user directs the display of the next search result, control passes to block 204 through line 206, directing block 204 to display a different one of the pointed-to digitized segments. When the user requests a new search, control returns to block 200 via line 207.

Figure 3:
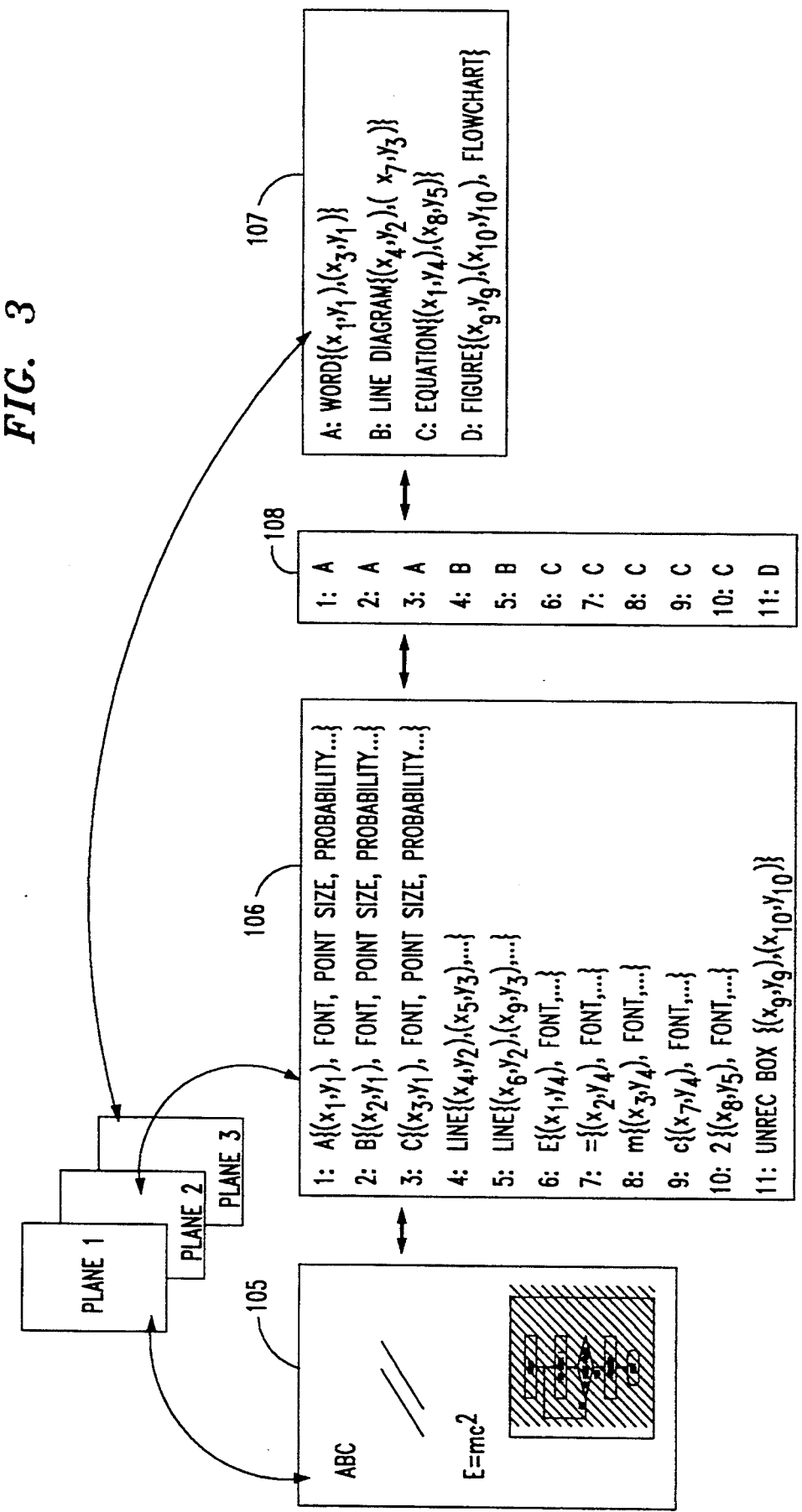
FIG. 3 illustrates in greater detail the three planes of information which are associated with each displayable segment.

FIG. 3 presents an example of the three planes of video information of a page from, say, a notebook. Plane 1, shown as frame 105, contains the letters "ABC-"—that being the text on the page—two diagonal lines slightly below and to the right of "ABC", the equation "$E=mc^2$" below the diagonal lines and in the center of the page and, lastly, a grey-scale picture below the equation. It should be appreciated that although frame 105 in FIG. 3 is depicted in a manner that is recognizable to the human eye, in reality that information is stored in memory 102 as a block of individual pixels having specified darkness levels (alternatively, to reduce storage the pixels can be encoded in any one of well known techniques).

Plane 2, with data that relates to the data of block 105 and which is marked 106, illustrates one manner by which the information contained in the digitized image of 105 may be stored in the form of elemental information entities that are contained in the image. It may be noted that one of the elemental information entities is an "unrecognized box". This entity can encompass not only pictures but other markings on the page, such as unrecognized letters, symbols, scribbles, doodles, etc. In some embodiments, this elemental information entity may also encompass all handwritten letters (such as signatures).

Plane 3, with data that relates to planes 1 and 2 and which is marked 107, contains the macro elements, or blocks, that are found in the image. In FIG. 3 frame 107 contains only four entries: one for the text, one for the diagonal lines, one for the equation, and one for the picture. Table 108 is the table of pointers that ties the logical page blocks of frame 107 to the elemental information entities of frame 106 and to the digitized segment of frame 105.

The actual programs for implementing the search scheme described above in connection with FIGS. 2 and 3 are completely conventional. Almost any commercial database manager program can be augmented (by adding appropriate program modules) to incorporate that aspect of this invention which identifies a translated segment but displays the digitized segment that is associated with the translated segment.

Figure 4:
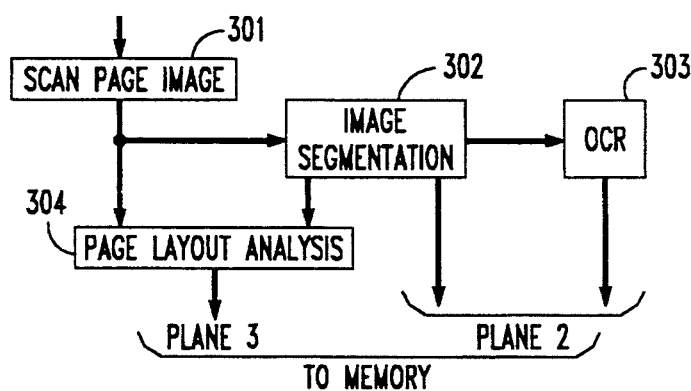
FIG. 4 outlines the processes for developing the information in plane 2 and in plane 3.

The more challenging task is to create the translated planes from the raw scanned data. This process is outlined in FIG. 4 which comprises two parallel paths which diverge from the scanned image output of block 301: one path contains blocks 302 and 303, and the other path contains block 304.

Image segmentation block 302 identifies areas in the scanned image output of block 301 which cannot be recognized by a conventional optical character recognizer. The purpose of block 302 is to eliminate from consideration by the following OCR block (303) those areas of the image that do not contain information that can be identified by the OCR block. There is a need to find those areas anyway, and there is no sense to burden the OCR block with analyses that will not be fruitful. In the case of FIG. 3, the task of block 302 is to identify the lines and the grey-scale picture in plane 105. This is accomplished with texture analysis of the image to determine types of regions and classifying them as: blank, text, line diagram, equation (or symbolic line of non-ASCII elements), line segmentors, binary picture, dithered picture, grey-scale picture and color picture.

Figure 5:
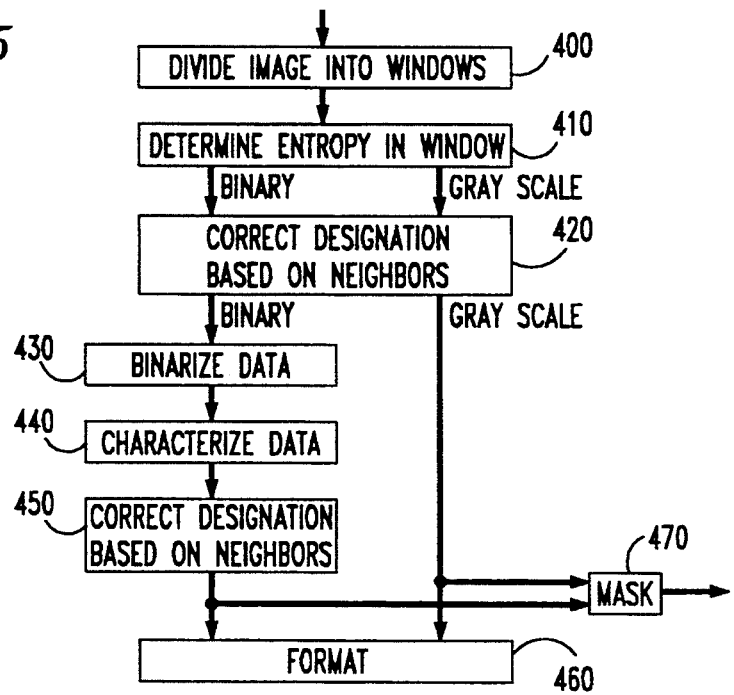
FIG. 5 presents a flowchart of texture analysis.

The texture analysis can be performed on a gray-scale image as illustrated in FIG. 5. In block 400, the image is divided into contiguous, non-overlapping, windows of a size that is slightly larger than the most commonly occurring character size. In block 410 the pixels in each window are examined to determine the entropy (measure of disorder, or variation) in the window. Regions whose entropy measure is low are labeled as binary (suggesting that the window contains either a character or a portion of a line drawing) windows, and whose entropy measure is larger are labeled as gray-scale picture windows. In block 420 the label attached by block 410 to each window is reviewed, based on the 8 nearest neighbors of each window, and corrected if necessary. Individual windows are corrected so neighboring windows that have the same label form regions with an expected shape and size that is appropriate to the particular page being analyzed (usually rectangular), known a priori by domain information.

The binary labeled windows (and regions) are directed to block 430 where the input is binarized; i.e., set to 1 or zero by thresholding with respect to a value intermediate between high and low gray-scale values.

The output of block 430 is applied to block 440 where the binary label is refined as follows:

if there is a high percentage of 1-valued pixels in a window, with the 8 neighbors being 0-valued, then the window is labeled as a dithered window;

if there is only 1 or a few connected (neighboring) windows of 1-values, with a proportion of 1- to 0-valued pixels being about 1/16 to ⅛, then the window is labeled as a text window;

if there is only 1 or a few connected windows of 1-values, with a proportion of 1- to 0-valued pixels being less than about 1/16, then the window is labeled as a line graphics window;

if there are no 1-valued pixels in the window, then window is labeled as an empty window;

if there are only 1-valued pixels, then the window is labeled as a binary picture window (black);

The output of block 440 is applied to block 450 where the label attached by block 440 to each window is reviewed, based on the 8 nearest neighbors of each window, and corrected if necessary. As in block 420, individual windows are corrected so neighboring windows that have the same label form regions with an expected shape and size that is appropriate to the particular page being analyzed (usually rectangular), known a priori by domain information. Lastly, the gray scale output of block 420 and the output of block 440 are combined and formatted in block 460 to form the "plane 2" output of block 302, and in block 470 to form the mask for OCR block 303.

Thus, block 302 identifies the unrecognized segments in the scanned image and develops a template that instructs OCR block 303 to ignore certain areas of the image.

Block 303 which follows block 302 is a conventional OCR block (e.g., Calera RS-9000) and it identifies the characters of frame 105. The combined output of image segmentation block 302 and OCR block 303 forms frame 106. The output of block 303 is the plane 2 information.

Figure 6:
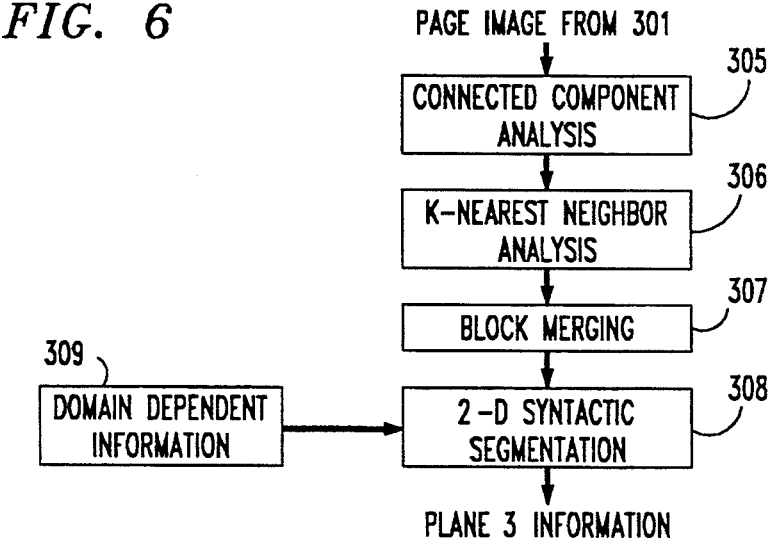
FIG. 6 presents a more detailed flow diagram of the processes associated with the plane 3 information.

FIG. 6 presents a more detailed flow chart of the process carried out in block 304 of FIG. 3. Block 305 accepts the scanned image information of block 301 and analyzes that information to identify connected components. The set of connected components developed by block 305 are applied to block 306 which determines the K-nearest neighbors of each block. Results of the analysis performed in block 306 and provided to block 307 merges image components to create logical blocks. Lastly, the logical blocks developed by block 307 are analyzed through a parsing process in block 308 to obtain a syntactic segmentation of the information contained in the scanned image. The syntactic segmentation is guided by information provided by block 309, which is derived from a priori knowledge of the format of the scanned image.

The task of determining connected components on the scanned image (i.e., the task of block 305) can be carried out as follows. First, consider every pixel in the image, and for every pixel that has value "ON" (i.e., it is darker than a preselected darkness level), determine whether 1 or more of its 8 closest pixels (N,S,E,W,NW,NE,SW,SE) has value OFF. If so, label the center pixel as a contour pixel. After this, link the contours into chains by first searching the image pixels in any sequential (row-column or column-row) order in the neighborhood of the found contour pixel until another contour pixel is found. Once a contour pixel is found, follow the contour from one contour pixel to a neighboring contour pixel, erase (set to non-contour value) each such pixel and also store the location of each contour pixel in a vector labeled by a distinct connected component number (index). That vector designates a connected component, e.g., a character. Continue populating that vector until there are no neighboring contour pixels left. Thereafter, find another contour pixel and begin identifying a new connected component. Repeat the process of identifying connected components until no contour pixels remain. Lastly, determine the centroid of each connected component, and store the location (x and y position) of the centroid for each of the connected components. The x position of the centroid is determined by adding the horizontal positions of all of the contour pixels in the connected component and dividing the sum by the number of such pixels. Similarly, the y position of the centroid is determined by adding the vertical positions of all of the contour pixels in the connected component and dividing the sum by the number of such pixels.

The k-nearest neighbor analysis (block 306) can be carried out by choosing a value for K (typically 3, 4 or 5), and for each connected component, finding the minimum Euclidean distance from the centroid of the connected component to the centroids of each of other components. The nearest K neighbors are identified and their indexes are stored in association with the connected component, along with distance and angle to each. The result of this process is a table that may have the following format:

| Comp i | Neighbor 1 | | | Neighbor 2 | | | Neighbor 3 | | |
|---|---|---|---|---|---|---|---|---|---|
| | index | dist. from i (pels) | angle from i (°) | index | dist. from i (pels) | angle from i (°) | index | dist. from i (pels) | angle from i (°) |
| 3 | 12 | 30 | 5 | 17 | 52 | 91 | 18 | 28 | 4 |

To merge connected components to create segment blocks (block 307), one needs to first determine the skew angle of the image, the intercharacter spacing, the inter-word spacing and the inter-line spacing.

The skew angle is determined by finding the peak angle of all neighbor pairs from a histogram of these angles.

The inter-character spacing is determined by grouping the pairs in distance range groups. Pairs that correspond to adjacent characters will have a small distance within some range and they will form the most populous group. Averaging the distances in this group yields the nominal inter-character spacing. The group of pairs that are within the range of a slightly larger average distance are the pairs of characters at the end of one word and the beginning of the next word. Averaging the distances in that group yields the nominal inter-word spacing.

The inter-line spacing is determined by identifying all pairs where the angle relative to the skew angle is greater (in magnitude) than 45°; and for all such pairs, finding the most frequent average distance. Finding the most frequent average distance means observing that the pair distances can be grouped into distance ranges, identifying the group that contains the largest number of pairs and computing the average pair distance for that group. This is the inter-line spacing.

From the above it is easily appreciated that "words" are groups of connected component pairs whose angles are within 45° of the skew angle and whose pair distances are within a chosen tolerance of the intercharacter spacing. "Lines" of text are groups of connected component pairs whose angles are within 45° of the skew angle and whose distances are within a chosen tolerance of the inter-word spacing. "Blocks of text" are lines of text whose average inter-line spacings are within a chosen tolerance of the inter-line spacing.

As depicted in FIG. 3, the "words", "lines", and "blocks" are stored in translated plane 3 with pointers to their connected components, and spatial coordinate information.

The segment blocks identified in block 307 are parsed in block 308 to create logical blocks of the segment. The process carried out in block 308 is described in detail in a copending application Ser. No. 07/720318 entitled "A Method and Apparatus for Parsing Images" filed Jun. 25, 1991, which is incorporated by reference herein. To do its parsing, block 308 employs "domain-dependent" information that is provided by block 309. The information of block 309 is supplied by the user. This information may state, for example (for correspondence letters), that "the date is found at about 2 inches from the top of the pages, it is a block of text that is shorter than 2 inches and it has at least 4 inches of white space to its left". It is also likely to state that "the subject is a block of text that is indented, is below a line that begins with 'Dear', and it starts with 'Re'", etc. This is the information that describes the characteristics of a page that make it a "correspondence letter".

Once the information is parsed and block 107 of FIG. 2 is populated with the information that specifies the logical blocks, a linking must take place between the different elements of the three planes of information. This is accomplished in a straight forward manner as outlined below, and the results placed in table 108.

The initial information is: coordinates of each pixel on plane 1; coordinates of bounding boxes or contours of the connected components, which are the elemental entities of plane 2 discussed above; and coordinates of blocks on plane 3. Therefore, planes 2 and 3 are linked to plane 1. To link planes 2 and 3, one needs to merely test each elemental entity in plane 2 for overlap between the elemental entity box and a block in plane 3. If the elemental entity overlaps a block, a pointer is created from the elemental entity to the block, and vice-versa. These pointers are incorporated in table 108 shown in FIG. 3.

As indicated above, from the standpoint of the mechanics of performing the search, searching for particular information within the FIG. 1 arrangement is fairly conventional. That is, various database manager programs can easily be tailored to effect searching in blocks 106 or and/or 107. However, because of the particular structure of the FIG. 1 arrangement, the overall effect is very powerful. For example, aside from the capabilities made available by the hierarchical structure of the databases, the parsing carried out by the process of block 308 creates a wealth of information that may be used during a search and retrieve session. In a database of correspondence letters, for example, the domain-dependent information in block 309 is likely to identify the addressee of a letter, the date of the letter, the "Re:" line of the letter, the sender, and perhaps the sender's company. Consequently, searching can be performed on any one of those categories. The identity of categories is, in effect, automated by the parsing process and the search categories come naturally. That is, the categories that are selectable (and searchable) originate from the domain-dependent information of block 309 and, hence, are easily changeable from one data base to another. These categories can be easily displayed on the screen via an icon arrangement, and searching in a category can be specified by merely pointing to an icon. Search of categories can also be performed through the search window (see element 100 in FIG. 1) by specifying the search in a manner akin to the specification of the search in the NEXIS database.

The following three examples illustrate just some of the power in the search and display capabilities of this invention.

As a first example, it is not uncommon for a page of text in a technical article to contain references to information that is not found on the very same page. One example is references to materials that are identified by the author as being relevant to the subject at hand ("references"). In many magazines the format for indicating that a reference is being identified is very specific (e.g., initials of the author and a number, such as [JPM88]). This format forms a piece of information that can be included in block 309. When the domain information specifies this format and an instance of the format is found in the scanned page by block 308, in accordance with the principles of this invention a link is provided between the string, e.g., [JPM88], and the image segment which contains the details of the reference identified by [JPM88]. With this link in place, when a user obtains a display of a text which contains [JPM88] and the user highlights this string, the image segment which contains the details of the reference is retrieved from the database and displayed, preferably in a second window, on the computer display.

Another instance of a reference to information that is not contained in the displayed page is often found with references that relate to figures, plots, tables, pictures, etc. Again, this invention permits the domain-information to form a link which associates a reference such as "FIG. 3" with another image segment that is stored in the computer which represents FIG. 3 (i.e. which has a "title" that comprises the string "FIG. 3").

The above-described capability introduces a very powerful tool for computerized browsing which is not found in any prior art computerized system but which is easily realized and often used when a user reads a printed version of an article.

As a second example, over and above having the ability to refer to specific portions of the same article that are referenced by indications such as "FIG. 3" and "[JPM88]", the FIG. 1 arrangement offers the capability to actually call up the indicated reference (i.e., the reference abbreviated by [JPM88]) or any other reference that the user may want to view immediately (or concurrently) either in the same window or in a separate window of the computer screen.

As a third example, even when the OCR and associated processes do not faithfully convert, or translate, the scanned image, it is still possible to identify entries based on a key word that is slightly corrupted and then permit the user to correct the translation. It is also possible, with the FIG. 1 arrangement, for the user to observe that some input word is either poorly scanned or, perhaps, misspelled in the original, and correct it. The correction is effected by the user highlighting the image portion of his choice, whereupon the translated version of the highlighted portion is shown on a separate screen. That translated portion can then be edited for future reference and use.

It may be noted that in describing the OCR process (303) no mention was made of the specific OCR process that is employed, other than suggesting that a conventional one may be used. In fact, we employ an OCR process takes advantage of unigram and digram probabilities to decide on the characters. That is, in deciding a character, cognizance is taken of:

the probability that a proposed character should appear, the probability that the proposed character should appear, given the character that is observed, the probability that the proposed character should appear, given the character that precedes it (which was decided upon already), and perhaps the probability that the proposed character should appear, given the character that succeeds it.

Over and above the recognition process, in accordance with the principles of this invention there is still room for leaving a character as an "unrecognized box" if, for example, the overall probability measure derived from the above equations is determined to be below a preselected threshold. In such a case, the OCR process 303 is allowed to translate such characters to a number of "possible" characters. Those "possible" characters have a probability measure associated with them, and information is used in the course of the search process. For example, a word such as "London" might be unclear and the recognizer may come back with the following:

"L"

"o"

"n" 70%, "m" 23%

"d"

"c" 46% "o" 68%, "e" 18%

"n" 50%, "m" 33%

By maintaining the collections of possibilities rather than deciding on a word of moderate overall probability measure, a user who wishes to search for, say, the name "Lomdem" would be offered the opportunity to inform the system that, perhaps, the word in question is "London" or, indeed, "Lomdem".

One of the advantages of this invention is that in spite of the failure by the OCR block to recognize characters that it perhaps ought to have recognized, displays to the user are not hindered by such failures. The user sees the scanned image and, as far as the user knows or cares, all of the characters have been properly recognized by the OCR block.

Another advantage of this invention is that even if the analysis of the displayed image is poor, it is the complete scanned image that is stored and, consequently, the output (both to the screen and/or the printer) may be in full resolution of the scanned image. Reductions may reduce the resolution to that of the screen or the printer, and enlargements may employ conventional interpolation techniques to provide enhanced resolution (at times it may be only a perception of enhanced resolution but that, too, has advantages).

A major advantage of this invention is that searching is performed in the second and third planes of the invention. This provides an effective search mechanism for what appears to be the original images.

Although there, unbeknownst to the user, instances of the "unrecognized box" entities may exist that might hinder the search process, in accordance with yet another advantage of our invention, the search algorithm evaluates the probability that a data portion (e.g., a word) may represent a match. When that probability is higher than a preselected threshold, the user is informed that a possible match has occurred, the data segment with a possible match is displayed, the unrecognizable portion is highlighted and the user is requested to confirm the match determination. If the user confirms, then the "unrecognized box" entities are replaced with the appropriate characters. If the user determines that the highlighted data portion (e.g., word) does not correspond to a match, the user is given an opportunity to specify what that data portion should be.

The procedure described above basically allows the data generation process to proceed without detours to resolve ambiguities in the OCR process. The user is consulted only when resolution of an ambiguity is in his immediate interest. This is still another advantage of this invention, since it permits a relatively quick means for populating the database with information.

Another advantage of this invention is that improvements in recognition processes (both contextual and otherwise) can be applied to the data within the FIG. 1 system even at a later time. This capability stems directly from the fact that the original scanned data is not discarded. Hence, it can reprocessed.

One major goal of this invention clearly is to create a framework for an electronic library. To this end, in the course of discovering this invention and developing it capabilities, numerous technical journals have been scanned into an experimental system. A user of such a system is given the option to either specify a particular journal or to see in a single image all of the journals that are contained in the database. When choosing the latter option, a reduced replica of the scanned images of the first page of the latest issue of the journals are arranged in an array and displayed to the user. The first page of these journals typically contains the journal's logo, date, and other information, such as an indication of the primary topic of that issue. By pointing to the reduced image of a particular journal, the user selects the journal and the particular issue. At that point, a non-reduced image of the journal's first page appears and the user can then request other information relative to that issue, such as the table of contents of the issue (if that is not already contained on the first page) or particular articles. Searching through other issues of that technical journal can also be carried out.

To demonstrate the versatility of this invention, some patents have also been scanned into the experimental system. The patents have been scanned in their entireties to form a completely searchable database that is capable of displaying to the user images of all pages. The system is also capable of also displaying just the first page of each patent; which typically includes text and a drawing. This is a very powerful capability, because those who wish to carry out novelty searches typically wish to identify patents where certain key words are present in the text. Having identified a number of patents, they typically wish to view the first page of those patents, as an efficient way to reduce the number of patents that need to be studied carefully.

One important use for this invention may be found in connection with litigation. The discovery process in litigation often results in substantial numbers of documents that are delivered by one party to the other. Those documents need to be analyzed and indexed, if they are to serve the needs of the receiving party. Scanning those documents and storing the images with an aid of an OCR system would be very useful. However, those documents often contain handwritten information which existing OCR systems cannot handle. By employing the principles of this invention, the true document images may be stored and, to the extent possible, the OCR recognizable entities are stored in the translated images, and can thereafter be searched. Another problem that discovery documents present relates to the identification of information categories. Whereas, with "form letters" and the like, domain-dependent information can be obtained or derived, with many other documents that is not the case. One solution, in accordance with the principles of this invention, is to create pseudo-domain-dependent information by marking color-highlighted blocks with commercially available wide felt-tip pens having different transparent colors. The area surrounding a date can be marked, for example, with a red highlight; the area surrounding the author's name can be marked, for example, with a yellow highlight; etc. This requires the scanning equipment to be sensitive to colors, of course; but this capability is available in commercial scanners.

The above capabilities are described in the context of text but, indeed, the same principles are directly applicable to other stored information, such as audio. What is common to visual matter and audio matter is that both relate to information which can be presented by a computer and perceived by human senses. Encompassing both, the term "A-V perceivable information" is used herein to represent video information, audio information, or both audio and video information.

In connection with an audio application, for example, an important speech may be recorded, digitized, and stored. This forms the "plane 1" information. The "plane 2" information, which is the translated information, comprises the phonemes described in ASCII characters, and the words that are formed from collections of phonemes.

We claim:

1. A method for accessing a physically perceivable information segment from a plurality of physically perceivable information segments stored in a computer storage medium COMPRISING THE STEPS OF:

maintaining in said computer storage medium a digitized representation of each of said plurality of physically perceivable information segments.

maintaining in said computer storage medium at least one corresponding translated representation of each of said plurality of physically perceivable information segments, maintaining in said computer storage medium binding information that associates elements of each translated representation of each physically perceivable information segment with portions of the corresponding digitized representation of each physically perceivable information segment, and in response to a user request, selecting one of the physically perceivable information segments maintained in said computer storage medium, and presenting the digitized representation of the selected physically perceivable information segment to the user.

2. The method of claim 1 wherein the step of selecting searches through the translated representation of at least some of said plurality of physically perceivable information segments and, based on the user request, selects said one of the physically perceivable information segments.

3. The method of claim 1 wherein said translated representation of an physically perceivable information segment contains elemental informational entities of said physically perceivable information segment derived from a first analysis process of the corresponding digitized representation of said physically perceivable information segment.

4. The method of claim 3 wherein said translated representation of an physically perceivable information segment further contains higher order informational entities of said physically perceivable information segment derived from an analysis process of the elemental informational entities.

5. The method of claim 4 wherein the user request specifies the presence of chosen higher order informational entities in the selected physically perceivable information segment.

6. The method of claim 4 wherein each of the translated representation is a result of a processing step that translates the corresponding digitized representation into a collection of elemental informational entities, which processing step is carried out without interactive assistance from a human for the purpose of improving the translation of the digitized representation into said collection of elemental informational entities.

7. The method of claim 6 wherein a second analysis process groups said elemental informational entities into macro-elements, based on the position of said elemental informational entities on said physically perceivable information segment relative to the position of other elemental informational entities on said physically perceivable information segment.

8. The method of claim 3 wherein said binding information correlates the elemental informational entities in the translated representation of a given physically perceivable information segment with subsegments of the digitized representation of the given physically perceivable information segment.

9. The method of claim 8 wherein said binding elemental information further correlates groups of informational entities in the translated representation of the given physically perceivable information segment with super-subsegments of the digitized representation of the given physically perceivable information segment, which groups form logical blocks within the given physically perceivable information segment.

10. The method of claim 8 wherein said binding information further correlates groups of elemental informational entities in the translated representation of the given physically perceivable information segment with super-subsegments of the digitized representation of the given physically perceivable information segment, which groups possess informational content to the user.

11. The method of claim 10 wherein the user request specifies a particular informational content in the selected physically perceivable information segment.

12. The method of claim 3 wherein the user request specifies the presence of particular elemental informational entities in the selected physically perceivable information segment.

13. The method of claim 3 wherein said elemental informational entities represent characters.

14. The method of claim 3 wherein said first analysis process includes analysis steps that recognize characters in said physically perceivable information segment.

15. The method of claim 1 wherein said physically perceivable information segments are image segments.

16. The method of claim 1 wherein said physically perceivable information segments are images of printed pages.

17. The method of claim 1 wherein said physically perceivable information segments are images of printed pages that include text and non-text material.

18. The method of claim 1 wherein said segment is an audio segment.

19. The method of claim 1 wherein each of the translated representations is a result of a processing step that translates the corresponding digitized representation into a collection of elemental informational entities, which processing step is carried out without interactive assistance from a human for the purpose of improving the translation of the digitized representation into said collection of elemental informational entities.

20. The method of claim 19 wherein said processing step
identifies digitized subsegments of said information segments that contain elemental informational entities
translates each digitized subsegment by a) identifying elemental information entities that are possibly contained in the digitized subsegment and b) with each identified elemental informational entity associating a confidence measure that the elemental informational entity is contained in the digitized subsegment, and
maintaining identified elemental informational entities that have an associated confidence measure that exceeds a preselected threshold.

21. The method of claim 1 wherein said step of presenting highlights resemblance of said user request when said resemblance is present in the digital representation of the selected physically perceivable information segment.

22. The method of claim 21 further comprising the step of requesting input from the user to confirm elements of the translated representation of each of said plurality of physically perceivable information segment.

23. The method of claim 1 further comprising the steps of
accepting user input that focuses attention to a particular portion of the presented digitized representation of the selected physically perceivable information segment, and
responding to user commands regarding the presented digitized representation of the selected physically perceivable information segment.

24. The method of claim 23 wherein said step of responding permits the user to modify elemental informational entities in the translated representation of the selected physically perceivable information segment.

25. The method of claim 23 wherein said step of responding includes a step of displaying additional information associated with the particular portion of the presented digital representation to which attention is focused by said user input.

26. A method for accessing a physically perceivable information segment from a plurality of physically perceivable information segments stored in a computer storage medium COMPRISING THE STEPS OF:

maintaining in said computer storage medium a digitized representation of each of said plurality of physically perceivable information segments, maintaining in said computer storage medium at least one corresponding translated representation of each of said plurality of physically perceivable information segments, maintaining in said computer storage medium binding information that associates elements of each translated representation of each physically perceivable information segment with portions of the corresponding digitized representation of each physically perceivable information segment, and in response to a user request, identifying physically perceivable information segments maintained in the computer storage medium that comport with the user request, and presenting to the user at least a portion of the digitized representation of an physically perceivable information segment identified in the step of identifying.

27. The method of claim 26 wherein said step of identifying accesses a pointer in a table that associates user requests with physically perceivable information segments.

* * * * *